Nov. 28, 1944.   E. L. WALTERS   2,363,631

SUPPORTING BED FOR GLASS SHEETS

Filed Jan. 10, 1942

Inventor
EMMETT L. WALTERS,
By Frank Fraser
Attorney

Patented Nov. 28, 1944

2,363,631

UNITED STATES PATENT OFFICE 2,363,631

SUPPORTING BED FOR GLASS SHEETS

Emmett L. Walters, Toledo, Ohio, assignor to Libbey-Owens-Ford Glass Company, Toledo, Ohio, a corporation of Ohio Application January 10, 1942, Serial No. 426,334

5 Claims. (Cl. 51—277)

The present invention relates broadly to the surfacing of glass sheets or plates and more particularly to an improved type of bed for supporting the said sheets or plates during surfacing and to the method of and apparatus for forming said bed.

In the surfacing of glass sheets according to one known process, a plurality of sheets are mounted upon a series of cars or tables arranged in end to end relation and movable continuously in a definite, substantially horizontal path to carry the glass sheets first beneath and in engagement with a series of grinding units and then beneath and in engagement with a series of polishing units. The glass sheets are laid end to end upon the cars or tables in slightly spaced relation, and it has been customary to secure the sheets upon the tops thereof by embedding them in a layer of plaster of Paris or the like. The plaster of Paris is ordinarily mixed with water and then poured upon the tables, with the plaster mix being spread as uniformly as possible over the tops thereof. The glass sheets are then laid upon the layer of wet plaster and pressed downwardly therein, usually by a rolling pressure applied to the upper surfaces of the sheets or by stamping thereon.

The quality of the resultant finish on the glass sheets (i. e., freedom from waves and distortion) as well as the amount of breakage during the grinding and polishing operations are largely dependent upon the proper laying of the glass sheets upon the work tables. Although the above-described method of securing the glass sheets to the tables with plaster has been in general use over a comparatively long period, it is not entirely satisfactory in all respects. For instance, it is relatively difficult to spread the plaster mix uniformly upon the tops of the tables to provide an even supporting bed for the glass sheets, with the result that, when the sheets are pressed downwardly into the plaster, strains are apt to be set up in the glass, tending toward breakage thereof during grinding and polishing. Further, when the strained glass sheets are released from the plaster, they will spring back to normal position, causing the formation of waves or distortion in the glass. Plaster also does not form a smooth supporting surface for the glass sheets and it may also contain foreign materials which will mar or scratch the glass surface. In addition, considerable time and labor is involved in mixing and spreading the plaster and in rolling or stamping the glass sheets therein.

An object of this invention is the provision of an improved type of supporting bed for the glass sheets formed from a material which will present a smooth, even surface of velvety texture and clothlike appearance upon which the sheets can be laid and which will not mar or scratch the glass.

Another object of the invention is the provision of an improved type of supporting bed for the glass sheet which can be rapidly and conveniently applied to the tables in an economical manner and upon which the glass sheets are adapted to be freely supported, whereby they may be readily placed thereupon and removed therefrom.

A further object of the invention is the provision of an improved method of and apparatus for forming the supporting bed wherein a flock material formed of short or powdered fibers is applied to the tops of the tables, preferably by spraying the same thereupon, to provide a soft uniform mat for supporting the glass sheets and also wherein the necessity of pressing the sheets downwardly upon or into the bed is eliminated.

Other objects and advantages of the invention will become more apparent during the course of the following description, when taken in connection with the accompanying drawing.

In the drawing, wherein like numerals are employed to designate like parts throughout the same:

Figure 1:
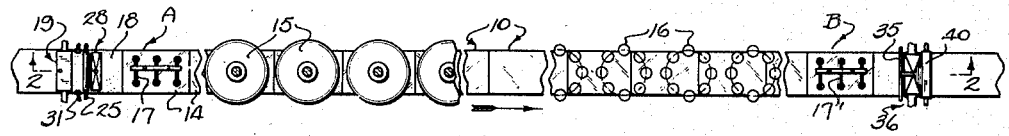
Fig. 1 is a plan view of one form of continuous system for surfacing sheet glass embodying the present invention.
Figure 2:
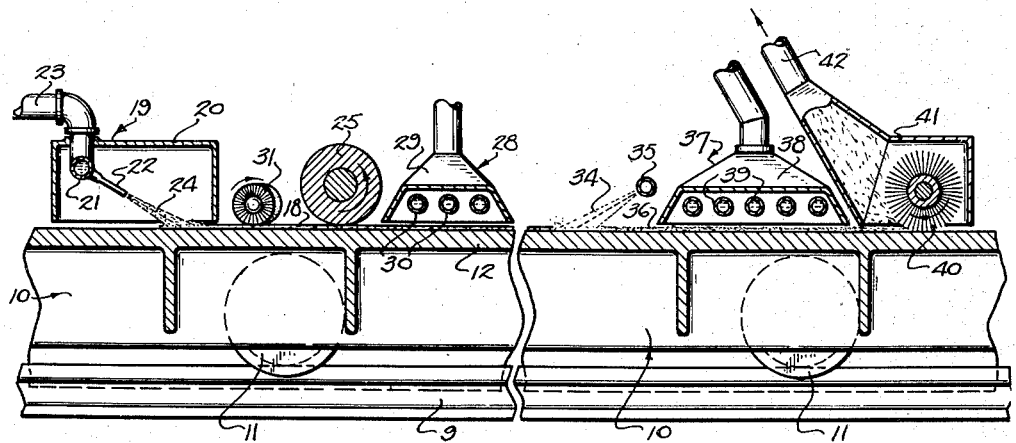
Fig. 2 is a vertical longitudinal section taken substantially on line 2—2 of Fig. 1.
Figure 3:
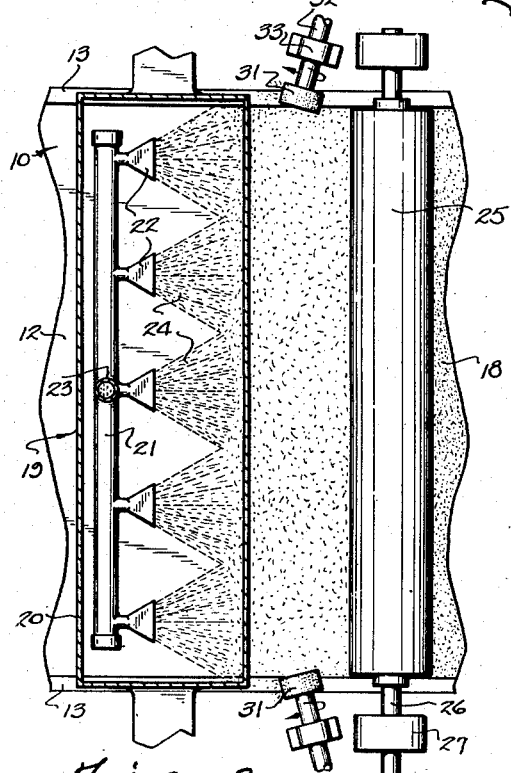
Fig. 3 is a plan view of a portion of the apparatus for forming the bed, partially in section.
Figure 4:
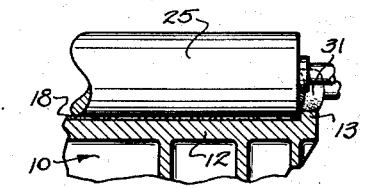
Fig. 4 is a detail transverse section taken substantially on line 4—4 of Fig. 3.

With reference now to the drawing, the continuous system for surfacing sheet glass therein disclosed comprises a plurality of cars or tables 10 arranged in end to end relation and suitably secured to one another; said tables having wheels 11 which run along rails 9. Each table 10 comprises a flat horizontal top 12 provided along the opposite side edges thereof with raised strips or ribs 13.

The glass sheets 14 to be surfaced are laid upon the tops of the tables 10 at the laying station represented by the letter A in Fig. 1, and carried in a definite, substantially horizontal path, first beneath and in engagement with a series of grinding runners 15 and then beneath and in engagement with a series of polishing runners 16. The sheets are then removed from the tables at the stripping station B, turned over, and the second side ground and polished. The laying of the glass sheets upon the tables at laying station A may be facilitated by employing a suitable suction frame 17 or the like, while a second suction frame 17' may be used to remove the sheets after surfacing at the stripping station B.

As pointed out above, it has been heretofore customary to secure the glass sheets 14 upon the tops of the tables 10 by first spreading a mixture of plaster of Paris or the like and water over the tables, then laying the glass sheets thereupon and finally pressing the sheets into the plaster by rolling or stamping. In accordance with the present invention, the use of plaster of Paris or like material is eliminated, and there is provided a new and improved type of supporting bed 18 for the glass sheets composed of a material which will form a soft, yielding mat upon which the sheets may be freely laid and which will not tend to scratch or mar the glass surfaces in contact therewith.

The supporting bed 18 is formed of short or powdered fibers of the type generally referred to as "flock." Various types of flock are available on the market; some being derived from cotton, some from wool, and some from artificial silks, such as rayon. Any of these may be used, although those derived from cotton or wool are preferred. Of course, other materials, such as rubber or rubber composition, may be employed, so that the invention is not restricted to the materials herein specified.

The flock material forming the bed 18 may be applied to the tops of the tables 10 in any desired manner, but it is preferably sprayed thereon as said tables move forwardly. To this end, there is positioned in advance of the laying station A a suitable spray apparatus 19 comprising a hood or housing 20 mounted in a fixed position above the path of travel of the tables 10 and closed at the top, sides and ends thereof but open at the bottom. Arranged within the housing 20 is a header 21 extending transversely of the tables and provided with a plurality of spaced spray nozzles 22 directed downwardly and forwardly in the direction of movement of the tables 10. The flock material to be sprayed upon the tables is delivered to the header 21 through a supply pipe 23 and is discharged from the nozzles 22 in the form of sprays 24 to form the bed 18.

The flock material may be sprayed upon the tables in loose, dry form or it may be sprayed in suspension in a liquid, such as water, or in an adhesive suspension. The size and spacing of the spray nozzles 22 is so determined that a layer 18 of even, uniform thickness will be applied to the tables. When sprayed upon the tables, the flock material will compact to form a relatively dense, soft, yielding bed for the glass sheets and which will not mar or scratch the glass surfaces. If desired, additional compacting of the flock particles may be accomplished by the provision of a presser roll 25 arranged transversely of the tables. The presser roll 25 is mounted upon a shaft 26 journaled in bearings 27 and may be driven in any desired manner. This roll also serves to smooth out any inequalities in the upper surface of the bed 18 and is particularly useful when the flock particles are sprayed upon the tables in loose, dry form.

When the flock material is sprayed upon the tables in an adhesive suspension, the particles thereof will of course adhere to one another and also to the tops of the tables. When the flock is applied in a liquid or adhesive suspension, it is necessary to remove the liquid or dry the adhesive before placing the glass sheets thereon. To this end, the tables 10, after passing beneath the presser roll 25, can be passed beneath suitable heating means 28 which serves to dry the supporting bed. The heating means 28 may be of any desired construction but is here shown as comprising a housing 29 containing a plurality of steam pipes 30. However, the drying of the bed may be accomplished by electric heating units, by infra-red radiation, or in any other desired manner.

A glass sheet 14 is then laid freely upon the supporting bed 18 at the laying station A and carried successively beneath the grinding runners 15 and polishing runners 16. If desired, any excess flock material along the sides of the tables may be removed by the edge brushes 31 keyed to shafts 32 journaled in bearings 33. These brushes are disposed at an angle to the direction of travel of the tables 10 and serve to remove excess flock material from the raised ribs 13 along the sides of said tables. After the glass sheets 14 have been ground and polished, they can be readily removed from the tables at the stripping station B.

Upon continued movement of the tables 10, the supporting bed 18 is subjected to the action of liquid sprays 34 from a transverse pipe 35 and which serve to loosen the flock from the tables, as indicated at 36. The tables can then be passed beneath a heater 37 which acts to dry the loose material. This heater may be of any suitable type, but as here shown comprises a casing 38 containing steam pipes 39 extending transversely of the tables. However, if desired, hot air blasts may be used for drying the material. Upon continued movement of the tables, the dried flock material is subjected to the action of a revolving cleaning brush 40 which removes it from the table. If desired, the brush 40 may be arranged within a housing 41 forming part of a vacuum system for effecting the carrying away of the material through an outlet 42 to a suitable reclaiming system. Of course, if the flock particles are sprayed upon the tables in loose, dry form, the liquid sprays 34 and heater 37 may not be required.

Figure 5:
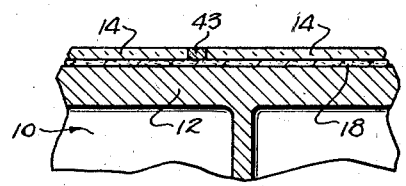
Fig. 5 is a vertical longitudinal section showing the manner of laying the glass sheets upon the work tables.

By spraying short or powdered flock particles upon the tables, they can be applied in an even, uniform manner to form a smooth, flat bed upon which the glass sheets can be laid. The glass sheets can be freely supported upon the bed without danger of being accidentally displaced during surfacing. Furthermore, the fibrous surface of the bed is soft and yielding and will not scratch or mar the glass surface. If desired, the glass sheets can be spaced from one another and a strip of plaster of Paris or the like 43 inserted between the adjacent ends thereof as shown in Fig. 5. By supporting the glass sheets freely upon the tables, they cannot only be more readily laid thereon but more quickly and easily removed therefrom after surfacing and with less liability of breakage.

It is to be understood that the form of the invention herewith shown and described is to be taken only as a preferred embodiment of the same, and that various changes in the shape, size and arrangement of parts may be resorted to without departing from the spirit of the invention or the scope of the subjoined claims.

I claim:

1. In apparatus for surfacing glass sheets or plates, a table for supporting the sheet to be surfaced, and a coating of fibrous material formed upon and adherent to the top of said table and forming a bed having a lower surface fitting the contour of the table top and a smooth level upper surface for receiving the glass sheet.

2. In apparatus for surfacing glass sheets or plates, a table for supporting the sheet to be surfaced, and a coating of flock material formed upon the top of said table and forming a mat having a lower surface fitting the contour of the table top and a smooth level upper surface for receiving the glass sheet.

3. In apparatus for surfacing glass sheets or plates, a table for supporting the sheet to be surfaced, and a coating of short or powdered fibers formed upon the top of said table and forming a bed having a lower surface fitting the contour of the table top and a smooth level upper surface for receiving the glass sheet.

4. In apparatus for surfacing glass sheets or plates, a table for supporting the sheet to be surfaced, and a layer of fibrous material formed upon the top of said table and providing a bed having a lower surface fitting exactly the contour of the table top and a smooth level upper surface for receiving the glass sheet.

5. In apparatus for surfacing glass sheets or plates, a table for supporting the sheet to be surfaced, and a coating comprising a mixture of flock material and an adhesive formed upon the top of said table and providing a bed having a lower surface fitting exactly the contour of the table top and a smooth level upper surface for receiving the glass sheet.

EMMETT L. WALTERS.